Nov. 8, 1960 W. E. ENDREZZE 2,959,143
RADIAL EXPANDING TAPER FORMED MOVABLE
FINS FOR MISSILES OR TORPEDOS
Filed Feb. 18, 1955 5 Sheets-Sheet 1

INVENTOR.
William Eugene Endrezze
BY

Nov. 8, 1960

W. E. ENDREZZE 2,959,143

RADIAL EXPANDING TAPER FORMED MOVABLE
FINS FOR MISSILES OR TORPEDOS

Filed Feb. 18, 1955

INVENTOR.
William Eugene Endrezze
BY

United States Patent Office 2,959,143
Patented Nov. 8, 1960

2,959,143

RADIAL EXPANDING TAPER FORMED MOVABLE FINS FOR MISSLES OR TORPEDOS

William Eugene Endrezze, 825 Cherry Ave., Long Beach 13, Calif.

Filed Feb. 18, 1955, Ser. No. 489,235

11 Claims. (Cl. 114—20)

The present invention relates generally to the field of carrier guiding devices, with particular reference to the fins upon missiles and torpedos, propelled by gas forming material contained therein. This application is a continuation-in-part of my copending application Serial Number 327,259, filed December 22, 1952, now abandoned, and Serial Number 407,651, filed February 2, 1954, now Patent No. 2,847,960.

The primary purpose in devising the present invention is to provide a highly accurate and dependable fin system for missiles that may be launched through the bore of a tube from aboard ship, preferably, but not restricted to a submarine, yet which may be launched from suitable land installations and movable crafts.

A major object of the present invention is to supply a carrier in the form of a missile provided with exterior guide means characterized by novel taper movable fins and stationary companion taper guides, a unique and novel interior construction for the operation and rigid holding of the movable taper fins in their fully extended position upon the exterior portion of the carrier that may be propelled by a variety of gas generating devices.

Another important object of the invention is to provide a carrier having a rearwardly converging stern portion upon which is mounted a plurality of hollow fins with their longitudinal edges in close parallel relation to the bore of a tube through which the carrier may pass.

A still further important object of the invention is to furnish a carrier with hollow stationary fins within which are provided movable taper fins to form an outward extension upon the stationary fins for maximum fin area upon the carrier in its flight.

Another object of the invention is to furnish a carrier provided with a triggering mechanism to actuate the release upon the movable taper fins for outwardly extension thereof.

Still another object of the invention is to furnish a carrier provided with a plurality of movable taper fins and companion taper guides mounted within the forward portion of the carrier as nose fins for frontal guidance.

Yet another object of the invention is to furnish a carrier provided with maximum fin area in extension, yet providing a greatly reduced package for transportation with the movable taper fins in collapsed condition, fully protected upon their vital longitudinal edges, and ready for instant use without the necessity of assembling the fins upon the carrier.

Another object of the invention is to furnish a carrier of small or great size that may be launched through the bore of a tube for accuracy and fuel conservation in its initial start, yet provide maximum fin area in its flight. Ramps, hangers, and launchers needed for fixed fins of large area provided upon carriers launched by these methods may be eliminated.

Another object of the invention is to furnish a carrier that may be launched from a tube submerged, in its flight through water and into the sky for great distances.

These and other objects and advantages will become apparent from the following description thereof, and from the drawings in which:

Figure 18, A and B are side and bottom views respectively, of an element of the triggering mechanism;

Figure 19, A and B are top and side views respectfully, of a pop-up muzzle actuated element of the triggering mechanism;

Figure 28–A is a cross-section view taken on the line 28—28 of Figure 26;

Figure 28–B is a cross-section view of a second form of taper faced movable fin in continuous taper sides, corresponding in general to the movable fin shown in Figures 26 and 27 as to triangular shape;

Referring to the drawings for the general arrangement of the invention, it will be seen that the two types of carriers C–1 and C–2 which are shown in Figures 1–5 and 11–12 defines the exterior configuration that comprises shell S–1 and shell S–2, that serves the same purpose, namely within which and upon which are constructed the necessary mechanism and components forming the missile or torpedo when used as such.

The carrier C–1

The carrier C–1 as used in the form of the invention shown in Figures 1 to 10 inclusive, and includes the shell S–1 which may be divided as having a mid-portion 2 generally considered the over-all diameter of the missile that determines the bore diameter of the firing tube through which the missile is to be fired. The front or nose portion 3 which is in continuation from the mid-portion is generally shaped according to the purpose for which the carrier is used. While the stern section 4 in continuation from the mid-portion develops into a streamline tapered rearwardly converging portion to ride in the slip stream of high velocity fluid through which it is passing with the least amount of turbulence created upon the stern end 5 of the carrier.

The movable taper sided fins and taper companion taper guides

Figure 1:
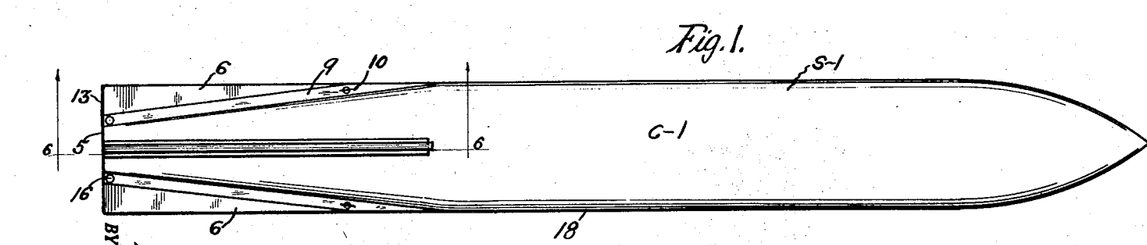
Figure 1 is a longitudinal view of the torpedo missile in normal external appearance.
Figure 2:
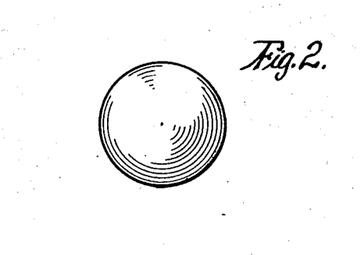
Figure 2 is a front end view of Figure 1 with the fins down.
Figure 3:
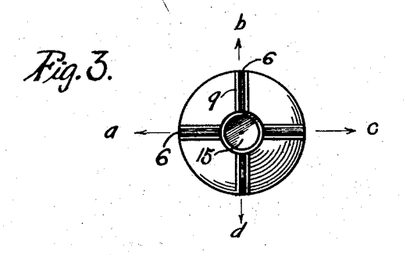
Figure 3 is a stern end view of Figure 1 showing the four fins radiating from a center.
Figure 4:
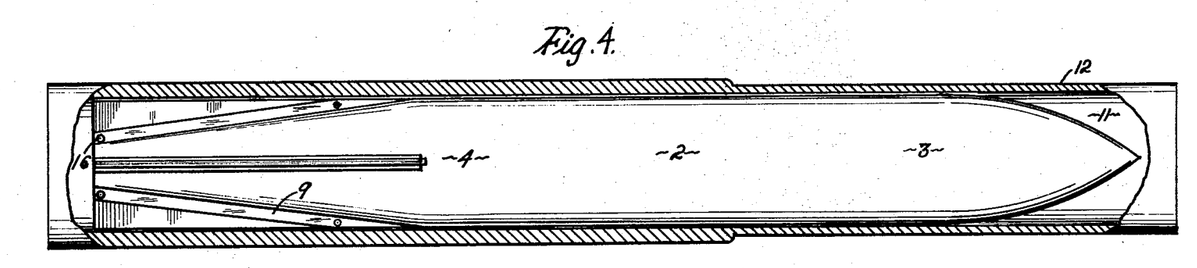
Figure 4 is a cross-sectional view of a firing tube showing the missile in normal position within the bore of the firing tube.
Figure 5:
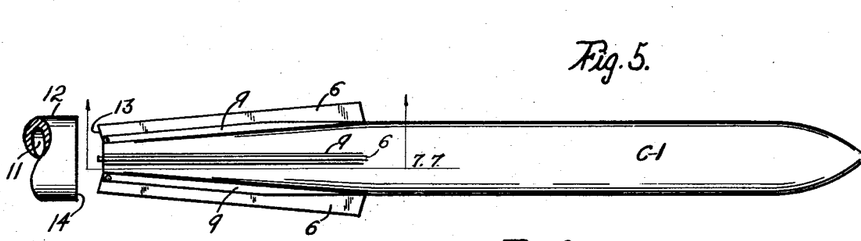
Figure 5 is a longitudinal view of the missile leaving the muzzle end of the firing tube through which it has passed, the fins shown here are rigidly locked in full extended position.

Extending longitudinally along the converging stern portion of the shell S–1 a number of equidistant movable taper sided fins 6 are provided that have a portion thereof extending within the shell S–1 that bears upon spring expanders 7 forcibly depressed by the fins in down position, and which act when the fins are released to forcibly expand the movable taper fins in an outwardly direction as indicated by the arrows a—b—c—d shown at Figure 3, to rigidly seat the taper skirt 8 of the fins within their tapering companion guides 9 fixed upon the shell S–1. By this method of structure in the use of taper faced movable fins and their companion taper guides, the union of the two elements are practically in a solid state to prevent any wobble of the carrier due to vibrating and side whip of non-rigid fins.

Normally to prevent damage upon the delicate fin edges and to facilitate handling in transit, the movable fins are pinned down by the pins 10 extending through the guides and fins which are extracted only to free the movable fins upon inserting the missile into the bore 11 of the firing tube where the movable fins are then held in down position by the inner wall of the firing tube. Upon discharging the missile from the firing tube, the movable taper fins which are under pressure by the depressed spring expanders 7 are in a condition to be extended outwardly at the instant the stern end 13 of the fins clear the end of the firing tube at the muzzle 14.

Figure 6:
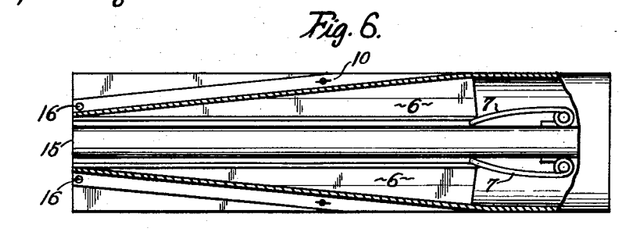
Figure 6 is a longitudinal cross-section view of the stern portion of the missile shell or carrier taken on the line 6—6 of Figure 1, showing the fins in normal collapsed position extending within the carrier.
Figure 7:
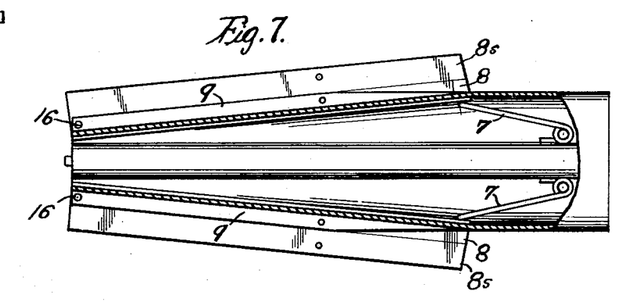
Figure 7 is an enlarged cross-sectional view taken on the line 7—7 of Figure 5, showing the fins in full extended outward position for its travel in flight.
Figure 8:
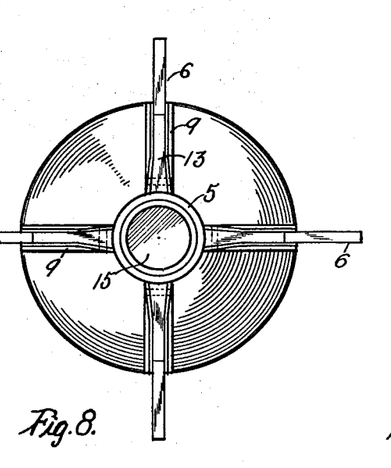
Figure 8 is a greatly enlarged stern end view of the carrier, capable of showing the taper of the movable fins in fully extended position rigidly supported within the tapering companion guides.
Figure 9:
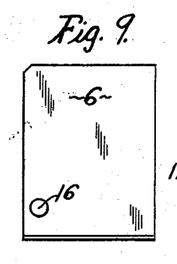
Figure 9 is an enlarged side view of a portion of the taper movable fin.

Figures 6 and 7 show a long sweep rearwardly converging stern portion of the shell S–1 and there at the stern end 5 of the missile surrounding the jet tube 15 are the movable taper fins 6 hinged within the taper fin guides 9 so that the movable fins may swing upon the pivot pins 16 to their fully extended outward position wedged within the taper 17 of the fin guides.

Figure 10:
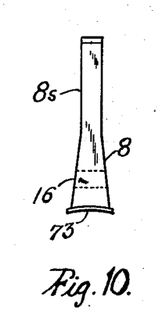
Figure 10 is an enlarged end view of Figure 9, showing the taper skirt movable fin.

As shown in Figure 10, the movable taper fin 6 is primary, and is itself provided for lateral extension. From its base edge 31 are its sides 8 that taper inwardly for a short portion of its height to continue with long straight sides 8s to its top edge 30. The segment 73 at its base edge in the form of an arc serves as a stop in contour abutment fit against the underside of the shell S–1 and may be leak proof, conditioned by a compressible gum coated thereon.

The fin expanders are fully described further on in the description.

The Carrier C–2

The carrier C–2 as used in the form of the invention shown in the Figures 11 to 31 inclusive, which defines the exterior configuration of the carrier C–2 includes a shell S–2 which serves the same purpose as shell S–1 heretofore described. The forwardly extending parallel edges 18 and inwardly curving ends with the apex thereof terminating at the center axis of the shell defines the front or nose portion 19. The edges 18 in extension towards the rear develops a cylindrical mid-portion 20 of sufficient length relative to the internal mechanical structure of the missile to enable the mid-portion 20 to guide the carrier when it is forcibly ejected through a tube. The surface edges 18 extending rearwardly from the cylindrical mid-portion 20 develop into a tapered converging stern portion 21 that terminates at the stern end 22 of the missile.

The primary stationary and hollow stern fins

A number of equidistant generally triangular and hollow stationary stern fins 23 are provided extending longitudinally on the outer surface of the stern portion 21, and projecting outwardly therefrom with their outer longitudinal edges 24 being substantially parallel to the outer longitudinal edge 24 of its opposite side fin. A longitudinal extending slot 25 is provided upon the surface of the fin edges 24 which is in open communication with the hollow interior compartment 26 of the fin and having the side portion 27 of the slot formed in taper relation to the taper provided upon the movable fin that it is to receive. At the forward end of these slots there is provided a pivot center in the form of a pivot pin 28 to which one end of the movable secondary fin 29 is hinged that is caused to swing outwardly into place and be rigidly wedged within the taper provided by the slots 25.

The taper provided secondary movable fin

Within the hollow interior compartments 26 of the stationary stern fins 23 are disposed a secondary movable fin 29 of generally triangular shape whose longitudinal top edge 30 being positioned within the slots 25 and substantially flush therewith, while its base edge 31 is longitudinally inclined in conformity with the converging stern portion of the shell S–2, and provided to bear upon a spring expander 7 in depressed condition provided at the rear end thereof. The forward end of the secondary movable fin is hinged at its pivot center 32 to the pivot pin 28 providing pivot means by which the fin may swing outwardly into place seating the taper 8 provided upon the fin within the taper seat 27 formed at the taper guide slot 25 of the hollow stationary stern fin. This wedging method provides a full rigid support for the extended portion of the movable fin which is comparable to a solid fixed fin of extremely efficient design, in its effect against flutter, vibration and wobble at high speed.

Figures 23, 24, 25, 26, 27, 28, 29, 30, 31:
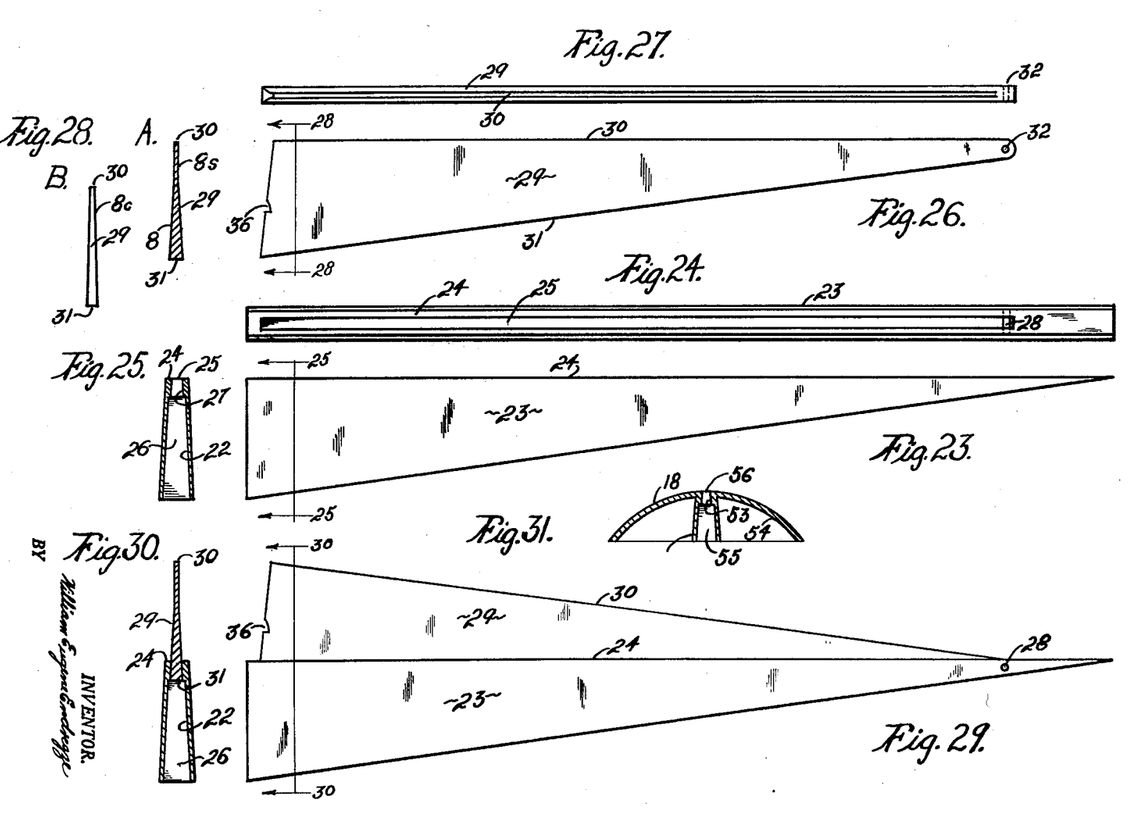
Figure 23 is a longitudinal side view of the stationary hollow stern fin of Figure 11.
Figure 24 is a longitudinal top view of Figure 23.
Figure 25 is a cross-section view taken on the line 25—25 of Figure 23.
Figure 26 is a longitudinal side view of the movable taper fin of Figure 12.
Figure 27 is a longitudinal top view of Figure 26.
Figure 29 is a longitudinal side view of the compounded fins such as in Figure 12.
Figure 30 is an elevational cross-section view taken on the line 30—30 of Figure 29.
Figure 31 is a view in segment of the carrier in cross-section at the nose fins, to illustrate the internal taper guide structure for the movable taper nose fins.

Shown in Figure 28–A, the secondary movable taper fin 29, from its base edge 31 has its sides 8 tapering inwardly for a portion of its height then continues with straight sides 8s to its top edge 30. For efficiency the fin should be as thin as structure and purpose will permit, which is indicated by the thin straight sides extending beyond the taper to cut the fluid through which it is passing. The taper serves a dual purpose in that it provides the effect of a wedge for rigidity and also a brace effect in support for the extended portion of the fin beyond.

Shown in Figure 28–B, the secondary movable taper fin from its base edge 31 has its sides 8c in a continuous taper inwardly to its top edge 30 providing a fin suitable for carriers of large size.

The movable fin expanders

Figures 15, 16, 17, 18, 19, 20, 21, 22:
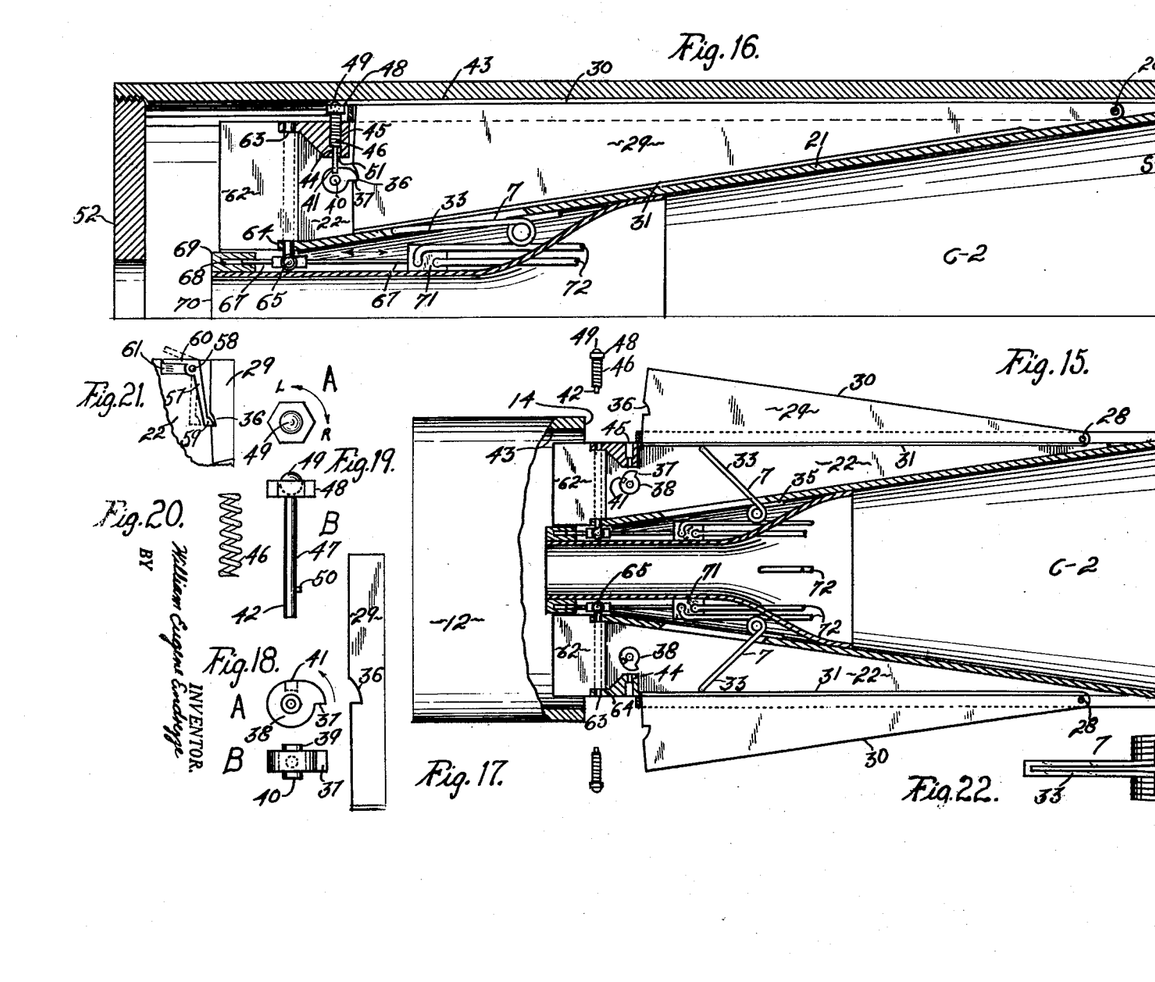
Figure 15 is a greatly enlarged cross-sectional view of the stern portion of the carrier shown in Figure 12 leaving the muzzle of a firing tube.
Figure 16 is a greatly enlarged one-quarter cross-sectional view of the stern portion of the carrier such as in Figure 12, shown positioned in a quarter section of the firing chamber of a firing tube.
Figure 17 is a side elevational view of a portion of a movable tapered fin.
Figure 20 is a companion spring element for the triggering mechanism shown in Figures 19 and 21.
Figure 21 is a second form of muzzle actuated element of the triggering mechanism.
Figure 22 is a longitudinal plan view of a spring, one form of movable taper fin expander.

I have devised several methods of movable fin expanders that can be applied as such for large and small carriers, namely, cam, eccentrics, lever and linkage, and springs. Shown in Figure 22 is a simple and efficient method in the form of a flat spring bar in return bend to form a double bar 33 and into coils 34 wound in opposite direction that terminates with extended ends 35 that act to hold the spring coils from revolving when the double bar is depressed producing torsional reaction strain in the coils. When the movable fins are in down position the double bar is depressed under strain which immediately reacts upon release of the depressed movable fin to extended position.

The triggering mechanism

To eliminate excessive friction by the movable fins of large carriers bearing against the inner wall of the firing tube through which it is to pass, I have provided a triggering mechanism of efficient positive action to hold the top edges of the movable fins spaced from the inner wall of the firing tube. Heavy pressure upon the fins by the fin expanders is transferred by holding through a triggering mechanism that bears lightly against the inner wall of the firing tube and is muzzle actuated, as may be seen in the Figures 15 to 21 inclusive, and which also represents the triggering mechanism applied to the nose fins of Figures 11 and 12.

In the form of the invention shown by the figures, the movable fins are provided to bear upon the end of the depressed double bar arm 33 of the expanders 7 and as there are four such fins located at the stern of the carrier, and four such fins located at the nose of the carrier, each are provided with the same expanders for their individual operation. A recess or fin cavity 36 upon the end of the movable fin engages a cam stop 37 extending from a cam shaped member 38 whose shoulders 39 act as a journal suitably seated upon the side walls 22 of the hollow fin compartment 26 and extending therethrough. The center of the cam shaped member is punched providing a key socket 40 to receive an externally insertable key for external setting of the cam stop 37 within the fin cavity 36 that simultaneously brings into alignment the cam cavity 41 drilled into the rim of the cam shaped member to receive the slidable lock-pin 42 which extends in pressure contact at its opposite end with the inner wall 43 of the firing tube. The lock-pin 42 extends through a guide 44 that terminates in a spring socket 45 to receive the spring 46 which surrounds the shank 47 of the lock-pin. The spring 46 is seated under the six sided head 48 of the shank that is formed to receive a ball bearing 49 that bears in rolling contact along the inner wall 43 of the firing tube. A lug 50 is formed upon the lock-pin that slides in a keyway recess 51 cut along the lock-pin guide 44 and is used as a safety device to lock the entire triggering mechanism with the movable fins in down position when turned counter-clockwise out of the path of the keyway recess 51. Figures 19 and 20 are assembled together as a cast-off unit, intended for use on carriers of large size.

In the operation of the triggering mechanism for the release of the movable fins to their fully extended position, first the fins are set by fully depressing the movable fins and with them the expanders 7 are depressed, an external key turns the cam member 38 to engage the cam stop 37 within the fin cavity 36 and held there while pressure upon the ball bearing 49 depresses the spring 46 and the slidable lock-pin 42 to seat in the cam cavity 41. The six-sided head 48 is then turned counter-clockwise a quarter turn that serves to lock the entire triggering mechanism and movable fins in down position. The missile carrier C-2 is inserted into the breech end 52 of the firing tube 12 and advanced a sufficient distance for the breech end to override the ball bearing 49 where the six sided heads are turned a quarter turn clockwise which aligns the lock-pin lug 50 with the recessed keyway 51. The spring 46 then forces the ball bearing 49 to bear lightly upon the inner wall 43 of the firing tube conditioning the triggering mechanism as now set for instant release. The missile carrier is fully inserted into the firing tube and the breech end 52 closed. Upon forcibly ejecting the carrier, the ball bearing rolls along the tube under light pressure as the carrier passes through the bore to the end of the muzzle. As the ball bearing head 49 clears the muzzle it pops-up under pressure from the spring 46 extracting the lock-pin 48 from the cam cavity 41. The cam shaped member 38 is now free to rotate the cam stop 37 out of the fin cavity 36 due to the force of the depressed fin expanders 7 acting upon the base 31 of the movable fins to forcibly swing them out into the taper guides to their fully extended position.

The nose fins for frontal guidance

Figure 11:
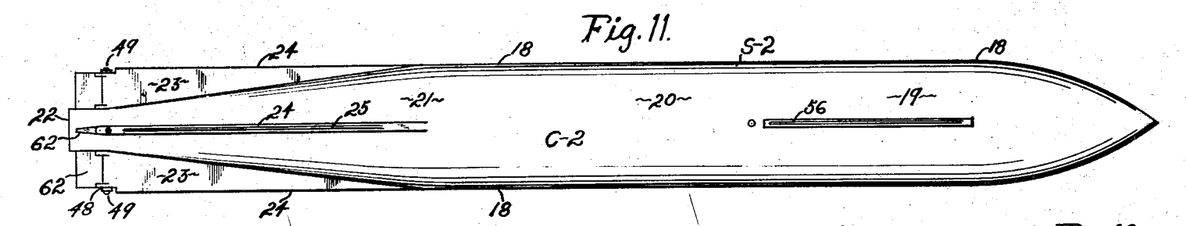
Figure 11 is a longitudinal side view of a second form of missile carrier, showing the stationary stern fins, rudder, and provided with nose fins.
Figures 12, 13, 14:
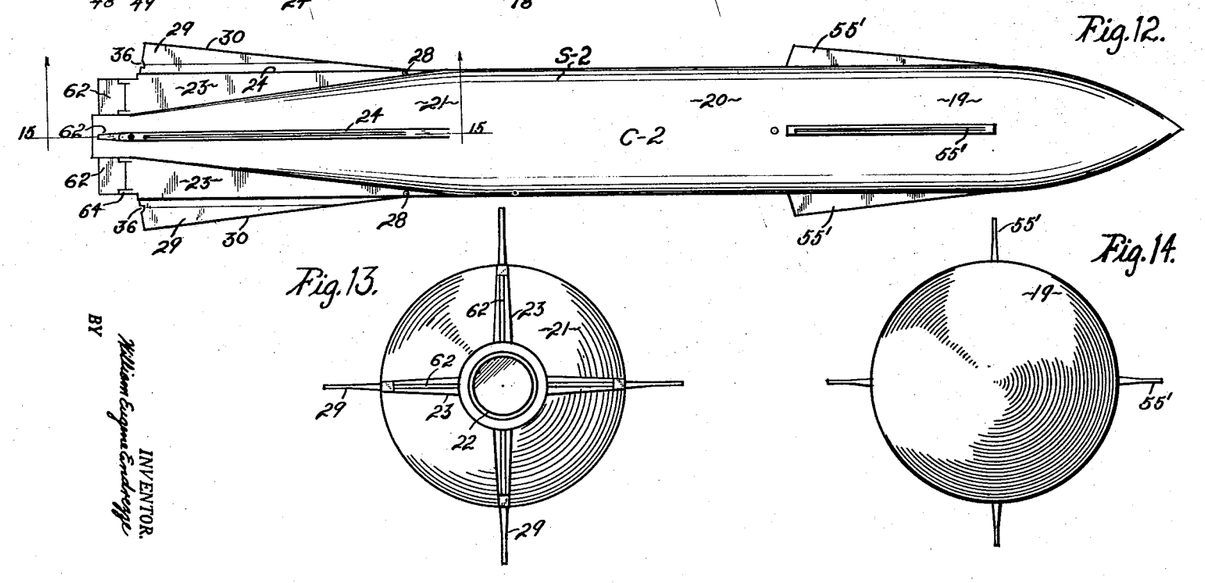
Figure 12 is a longitudinal side view of Figure 11, showing the movable taper fins in fully extended position, the stern fins and the nose fins.
Figure 13 is an enlarged stern end view of Figure 12.
Figure 14 is an enlarged front end view of Figure 12.

The general procedure in the operation of the nose fins, and its mechanism, are identical to that described for the secondary stern fins and its triggering mechanism, except for the taper fin guides 53 which are on the underside 54 of the shell S-2 of the carrier C-2, as shown in Figure 31 which represents a segment of the front portion 3 of the carriers in Figures 11 and 12, less the movable taper fin. The hollow compartment 55 receives the movable fins 55' which are extended by swinging outward through the slot 56 provided longitudinally along the surface 18 of the shell front portion 3.

The effective value of the nose fins for frontal guidance, with or without rudders cannot be overstated, when it is considered the high velocity of fluid coursing along the surface of the carrier towards the stern end of the carrier tends to align the carrier by terrific force according to the irregularities upon the carrier. They act to strenuously oppose the purpose of the rear rudders which are located in the most opposed position upon the carrier, due to the force of the slip stream of fluid on all sides acting to force any obstruction in alignment with the direction of the fluid passing. The nose fins are at the head of the carrier heading into the fluid through which it is passing before the slip stream of side pressure has developed to such a degree of intensity upon the stern end of the carrier, providing a condition where the nose fins located at the head of the carrier create a far more sensitive response upon the carrier for its guidance. Nose fins act to true the missile in its course and hold it against interfering elements, and where equipped with directional rudders provide the most efficient and responsive method for guidance upon a carrier.

For carriers of small size that may be fired through multiple of tubes, the muzzle actuated pop-up lever trigger shown in Figure 21 is provided. The lever 57 is fixed to pivot on the pivot pin 58 and extends to engage the fin cavity 36 with the lever stop 59 thus acting to hold the depressed movable fins in down position. The lever 57 is provided with an angle extension 60 that bears against the inner wall of a firing tube by the pressure of the spring 61. This triggering mechanism is located at the same position upon the carrier as the cast-off unit previously described, and replaces it on suitable carriers. As the angle extension 60 is in a depressed condition bearing against the inner wall of the tube through which it is passing, it pops-up upon clearing the muzzle end of the tube as indicated by the dotted lines. This in effect disengages the lever stop 59 from the fin cavity 36 which frees the depressed movable fins that are then forcibly swung outwardly to their fully extended position to wedge within the taper guides 9 under the force of the fin expanders. This muzzle actuated trigger mechanism remains with the carrier in its flight.

The carrier rudders

The carrier C-2 shown in the Figures 11, 12, 15 and 16 is provided with rudders 62 at the stern end of the fins 23 that act as a means by which the missile is steered. The rudders are keyed to the shaft 63 that passes through the hinge 64 and terminates with a ball arm 65 in lateral extension coupled in the ball socket 66 which rides upon the sliding shaft 67 of reciprocal motion. One end of the sliding shaft slides in the guide 68 formed upon the annular casting 69 which surrounds the aperture 70 at the stern end of the carrier, while at its opposite end the sliding shaft 67 passes into a hydraulic cylinder 71 to be attached to a piston there. Fluid feed lines 72 communicate with the hydraulic cylinder 71 and a master control cylinder, not shown. It is to be understood by this application that I do not claim any part of the rudder hydraulic operating mechanism.

The operation of the rudders is governed by the direction of pressure fluid flowing in the fluid feed lines that cause the sliding shaft to move in the desired direction, pushing or pulling the ball arm that turns the shaft upon which the rudders are fixed. The rudders must then turn with the shaft and accordingly steer the carrier as governed by the master cylinder and its electronic mechanism. There are four such rudders positioned at the stern end of the carrier fins, two on the vertical, and two on the horizontal. As these rudders are located in continuation with the carrier stern fins, they form a very desirable structural method of fin and rudder streamline assembly upon the carrier in its flight.

Without further analysis, the foregoing will so fully reveal the gist of my invention that others can, by applying current knowledge, readily adapt it to various applications without omitting features that, from the standpoint of prior art, fairly constitute characteristics of the generic or specific aspects of the invention and are intended to be comprehended within the meaning and range of equivalence of the following claims.

I claim:

1. A gas jet propelled torpedo or missile carrier capable of passing through the bore of a tube to start on its course for traveling through a fluid body, said missile carrier comprising an elongated and hollow cylindrical shell having a mid-portion of substantially constant exterior diameter that terminates on one end with a conical front portion and on the opposite with a tapered converging stern portion, a plurality of four primary stern fins each longitudinally disposed upon said converging stern portion and 90 degree circumferentially spaced from each other, said primary stern fins each being stationary and hollow with the side walls and an end portion thereof projecting outwardly from the surface of said converging stern portion, said side walls longitudinally being parallel to and spaced from each other providing a fin slot longitudinally between the top edges of said side walls and the end portion and a secondary movable fin compartment within said space, said secondary fin compartment being beneath and parallel to and directly connecting said longitudinally extending fin slot therewith, a secondary movable fin disposed in said compartment adapted to extend the surface area of said primary stern fins beyond the surface of said top edges upon lateral movement thereof, and said end portion extending the longitudinal limits of said compartment beyond the stern end of said fin slot providing a closed compartment adapted to house means by which said secondary fin is actuated.

2. A gas jet propelled torpedo or missile carrier capable of passing through the bore of a tube to start on its course for traveling through a fluid body, said missile carrier comprising an elongated and hollow cylindrical shell having a mid-portion of substantially constant exterior diameter that terminates on one end with a conical front portion and on the opposite end thereof with a tapered converging stern portion, a plurality of four primary stern fins each longitudinally disposed upon said converging stern portion and 90 degree circumferentially spaced from each other, said primary stern fins each being stationary and hollow with the side walls and an end portion thereof projecting outwardly from the surface of said converging stern portion, said side walls longitudinally being parallel to and spaced from each other providing a fin slot longitudinally between the top edges of said side walls and a secondary movable fin compartment within said space, said fin slot within the longitudinal confines of said top edges having the side surfaces formed inwardly divergingly tapered whereby the under side of said fin slot is of width greater than the width along the surface of said top edges.

3. A gas jet propelled torpedo or missile carrier capable of passing through the bore of a tube to start on its course for traveling through a fluid body, said missile carrier comprising an elongated and hollow cylindrical shell having a mid-portion of substantially constant exterior diameter that terminates on one end with a conical front portion and on the opposite end thereof with a tapered converging stern portion, a plurality of four primary stern fins each longitudinally disposed upon said converging stern portion and 90 degree circumferentially spaced from each other, said primary stern fins each being stationary and hollow and having the side walls and an end portion thereof projecting outwardly from the surface of said converging stern portion, said side walls longitudinally being parallel to and spaced from each other providing a fin slot longitudinally between the top edges of said side walls and the end portion and a secondary movable fin compartment within said space, fin latching and unlatching means disposed in said end portion and a secondary movable fin forcibly actuated disposed in said fin compartment, a spring actuated pop-up-trigger means disposed in flush seated alignment with the top edges of said end portion and slidably in contact with the inner wall of said tube and restrained by said tube latching said secondary fin in its depressed condition within the compartment of said primary fin, whereby muzzle actuated release of said trigger provides means by which said movable fin is unlatched to forcibly expand to its fully extended position beyond the surface of said top edges.

4. A gas jet propelled torpedo or missile carrier, said missile carrier comprising an elongated generally cylindrical shell having a mid-portion of substantially constant exterior diameter that terminates on one end with an inwardly converging front portion and on the opposite end thereof with a stern portion through which gaseous material generated by said missile passes, a plurality of four primary stern fins each longitudinally disposed upon said stern portion and 90 degree circumferentially spaced from each other, said primary stern fins each being stationary and hollow with the side walls and the end portion thereof projecting outwardly from the surface of said stern portion, said side walls longitudinally being parallel to and spaced from each other providing a fin slot longitudinally between the top edges of said side walls and the end portions thereof and a secondary movable fin compartment within said space, said fin compartment being beneath and parallel to and directly connecting said longitudinally extending fin slot therewith, a secondary movable fin with fin latching means and a fin expander that tends to forcibly actuate said movable fin disposed in said fin compartment, a fin triggering means and a fin stop member engaging the trigger and said fin latching means disposed within said end portion for holding said movable fin in a depressed condition against the force of said fin expander, whereby tripping of said trigger disengages the fin stop member from the fin latching means releasing the fin expander to forcibly expand said movable fin to its fully extended position and compound the surface area of said primary fin.

5. A gas jet propelled torpedo or missile carrier for traveling through a fluid body, said missile carrier comprising an elongated generally cylindrical shell having a mid-portion of substantially constant exterior diameter that terminates on one end with an inwardly converging front portion and on the opposite end thereof with a stern portion through which gaseous material generated by said missile passes, a plurality of four primary stern fins each longitudinally disposed upon said stern portion and 90 degree circumferentially spaced from each other, said primary stern fins each being stationary and hollow with the side walls and the end portions thereof projecting outwardly from the surface of said stern portion, said side walls longitudinally being parallel to and spaced from each other providing a fin slot longitudinally between the top edges of said side walls and a secondary movable fin compartment within said space, a secondary movable fin disposed in each of said fin compartments and a fin expander to actuate said movable fin, a plurality of four movable fin rudders for lateral and elevational steering of said missile carrier thereby, one of said fin rudders being longitudinally disposed, butt hinged and pinion shaft coupled in flush surface continuation from the stern portion of each of said primary stern fins, one end of said pinion shaft passing through an eyelet member of said primary fin and keyed to said fin rudder, the opposite end of said pinion shaft coupled to a power source by which said fin rudder is actuated, whereby the combination of fin slotted primary fins, secondary movable fins and fin rudders provide extended fin surface area and steering means for said missile carrier in flight.

6. A fin system for missile carriers capable of traveling through a fluid body by gas jet propulsion, said missile fin system comprising a primary and a secondary fin, the primary fin being stationary and hollow and of substantially triangular shape longitudinally with the side walls and the ends rising vertically from the bottom along the base edges thereof, said side walls longitudinally being parallel to and spaced from each other providing a fin slot longitudinally between the top edges of said side walls and a secondary fin compartment within said space, said fin compartment being beneath and parallel to and directly connecting said longitudinally extending fin slot therewith, said secondary fin being movable and of substantially triangular shape longitudinally and having the major portion thereof in width formed in thickness to pass through said fin slot and the remaining portion thereof in width formed in thickness along the base edges thereof to seat rigidly within the fin slot between the top edges of said primary fin, a fin stop cavity upon the stern end of said secondary fin and said fin being longitudinally disposed within the hollow confines of said primary fin, a cam and stop member latchingly engaging said cavity and rotatively being journalled in the side walls of said primary fin for holding said movable fin in a depressed condition, a fin trigger externally mounted and a trigger pin slidably engaging said cam and said trigger to stay said cam stop, and a fin expander to forcibly acuate said movable fin through said fin slot upon tripping of said trigger by the forward movement of said missile carrier unlatching said movable fin.

7. A fin system for missile carriers capable of traveling through a fluid body by gas jet propulsion, said fin system comprising a primary and a secondary fin, the primary fin being stationary and hollow and of substantially triangular shape longitudinally with the side walls and the ends rising vertically from the bottom along the base edges thereof, said side walls longitudinally being parallel to and spaced from each other providing a fin slot longitudinally between the top edges of said side walls and a secondary fin compartment within said space, said fin compartment being beneath and parallel to and directly connecting said longitudinally extending fin slot therewith, said secondary fin being movable and of substantially triangular shape longitudinally and having the major portion thereof in width formed in thickness to pass through said fin slot and the remaining portion thereof in width formed in thickness along the base edges thereof to seat rigidly within the fin slot between the top edges of said primary fin, said secondary fin having a fin stop cavity provided upon the stern end thereof being longitudinally disposed within the fin compartment of said primary fin, a cam and stop member latchingly engaging said cavity and rotatively being journalled in the side walls of said primary fin for holding said movable fin in a depressed condition, a fin trigger externally mounted and a trigger arm slidably engaging said cam and said trigger to stay said cam stop within the cavity of said movable fin, a fin expander in pressure upon the base of said secondary fin by which said fin is actuated, and a keyway through the center of said cam for turning said cam stop in alignment with the fin cavity in setting said trigger and locking immovable said primary fin.

8. A fin system for missile carriers capable of traveling through a fluid body by gas jet propulsion, said fin system comprising a primary fin structure longitudinally disposed upon the surface of said carrier in radial alignment with the axis thereof, said primary fin being hollow and stationary and longitudinally being narrow in thickness and broad in width and of substantially angular configuration, a bottom forming the base edges with the side walls and the ends thereof rising vertically from the bases edges thereof, said side wall longitudinally being parallel to and spaced from each other providing a fin slot longitudinally between the top edges of said side walls and a secondary fin compartment within said space, said longitudinally extending fin slot providing means through which a secondary movable fin slides extending the surface area of said primary fin thereby.

9. A gas jet propelled torpedo or missile carrier capable of pursuing a predetermined course when traveling through a fluid body, said missile carrier comprising an elongated generally cylindrical shell having a mid-portion of substantially constant exterior diameter, one end of said mid-portion forwardly extending and inwardly curving to terminate in a conical front portion and having the opposite end thereof rearwardly extending to terminate in a stern portion through which the gaseous material generated by said missile passes, a plurality of four longitudinally disposed and 90 degree circumferentially spaced primary stationary and hollow stern fins projecting outwardly from the surface of said stern portion and having the top edges of each of said stern fins aligned with the axis of said missile carrier, a relatively narrow fin slot longitudinally through the surface of each of said top edges, a secondary movable fin compartment longitudinally provided within the hollow confines of each of said primary stern fins, each of said fin compartments being beneath and parallel to and directly connecting each of said fin slots therewith, a secondary fin with a fin latching cavity formed thereon and a fin expander operatively engaging said movable fin disposed in each of said fin compartments, said movable fin having the major portion thereof provided to laterally pass through said longitudinally extending fin slot and said fin expanders adapted to forcibly activate each of said movable fins, a fin latching and unlatching member slidably disposed within said fin compartment engaging the fin latching cavity recessed in each of said movable fins to restrain said force in a holding depressed condition, and a fin trigger member slidably engaging said fin latching member seated within the cavity of said movable fin, whereby tripping of said trigger accomplished by the forward movement of said missile carrier disengages said fin latching member from the seat of said fin cavity releasing said movable fin and the force of said fin expander to seat each of said secondary movable fin within the fin slot of said primary fins.

10. A gas jet propelled torpedo or missile carrier capable of passing through the bore of a tube to start on its course for traveling through a fluid body, said missile carrier comprising an elongated hollow cylindrical shell having a mid-portion of substantially constant exterior diameter that terminates on one end with a conical front portion and on the opposite end with a tapered converging stern portion, a plurality of four primary stern fins each longitudinally disposed upon said converging stern portion and 90 degree circumferentially spaced from each other, said primary stern fins each being stationary and hollow with the side walls projecting outwardly from the surface of said converging stern portion vertically inclined throughout their height providing a base in width greater than the top edge thereof, said side walls longitudinally being parallel to and spaced from each other providing a fin slot longitudinally between the top edge of said side walls and a secondary movable fin compartment within said space, said fin compartment being beneath and parallel to and directly connecting said longitudinally extending fin slot therewith.

11. A gas jet propelled torpedo or missile carrier capable of pursuing a predetermined course when traveling through a fluid body, said missile carrier comprising an elongated generally cylindrical shell having a mid-portion of substantially constant exterior diameter, one end of said mid-portion forwardly extending and inwardly curving to terminate in a conical front portion, the opposite end of said mid-portion rearwardly extending and inwardly converging to terminate with a stern portion through which the gaseous material generated by said missile passes, said one end of the carrier shell having a plurality of four longitudinally disposed and 90 degree circumferentially spaced fin slots therethrough, a plurality of four longitudinally disposed fin compartments with side wall closures each of which being beneath and parallel to and directly connecting each of said fin slots therewith, each of said fin compartments housing a fin expander and a movable fin therein.

References Cited in the file of this patent
UNITED STATES PATENTS

| | | |
|---|---|---|
| 587,286 | Modersitzki | July 27, 1897 |
| 2,365,577 | Moore | Dec. 19, 1944 |
| 2,688,945 | Hughes | Sept. 14, 1954 |
| 2,744,697 | Van Allen | May 8, 1956 |
| 2,847,960 | Endrezze | Aug. 19, 1958 |

FOREIGN PATENTS

| | | |
|---|---|---|
| 120,476 | Great Britain | Nov. 14, 1918 |
| 497,173 | France | Nov. 27, 1919 |
| 285,092 | Italy | May 1, 1931 |